US011979724B2

(12) United States Patent
Nakashima et al.

(10) Patent No.: US 11,979,724 B2
(45) Date of Patent: May 7, 2024

(54) SPEAKER DIAPHRAGM AND HEADPHONE

(71) Applicant: Yamaha Corporation, Hamamatsu (JP)

(72) Inventors: Hiroshi Nakashima, Hamamatsu (JP); Tsunenori Sano, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 418 days.

(21) Appl. No.: 17/339,209

(22) Filed: Jun. 4, 2021

(65) Prior Publication Data

US 2021/0297782 A1 Sep. 23, 2021

Related U.S. Application Data

(63) Continuation of application No. PCT/JP2019/045861, filed on Nov. 22, 2019.

(30) Foreign Application Priority Data

Dec. 6, 2018 (JP) ................................ 2018-228738

(51) Int. Cl.
*H04R 7/12* (2006.01)
*H04R 1/10* (2006.01)

(52) U.S. Cl.
CPC .......... *H04R 7/125* (2013.01); *H04R 1/1008* (2013.01); *H04R 2307/021* (2013.01); *H04R 2307/029* (2013.01)

(58) Field of Classification Search
CPC ................ H04R 7/125; H04R 1/1008; H04R 2307/021; H04R 2307/029
See application file for complete search history.

(56) References Cited

U.S. PATENT DOCUMENTS

2016/0295330 A1* 10/2016 Fehervari .............. H04R 7/125
2017/0183500 A1 6/2017 Kumo et al.
2017/0206885 A1 7/2017 Kumo et al.
2017/0251307 A1* 8/2017 Ohara .................... H04R 7/125
2018/0310093 A1* 10/2018 Muramoto ............... H04R 1/10
2019/0069073 A1* 2/2019 Fujitani .................... H04R 5/04

FOREIGN PATENT DOCUMENTS

JP 9-107595 A 4/1997
JP 2017-118334 A 6/2017
JP 2017-126946 A 7/2017

OTHER PUBLICATIONS

Partial English translation of document C2 (Japanese-language Written Opinion (PCT/ISA/237) previously filed on Jun. 4, 2021) issued in PCT Application No. PCT/JP2019/045861 dated Dec. 24, 2019 (five (5) pages).
Tajima K., "Synthesis of Cellulose by Bacteria", Journal of the Society of Rubber Science and Technology, 2012, pp. 406-411, vol. 85, No. 12, [retrieved: Dec. 16, 2019] URL:https://www.jstage.jst.go.jp/article/gomu/86/12/86_406/_pdf/-char/ja with English Abstract (six (6) pages).

(Continued)

*Primary Examiner* — Forrest M Phillips
(74) *Attorney, Agent, or Firm* — Crowell & Moring LLP

(57) ABSTRACT

A speaker diaphragm includes a mixed layer. The mixed layer includes cellulose nanofibers, and polyparaphenylenebenzobisoxazole fibers. An average length of the polyparaphenylenebenzobisoxazole fibers is 0.5 mm or more and 4.0 mm or less.

7 Claims, 3 Drawing Sheets

(56) References Cited

OTHER PUBLICATIONS

Kondo, T., A Hierarchical Organizing Design for a Bottom-up 3-D Architecture Using a Bacterium Extruding a Cellulose Nanofiber, Sen'i Gakkaishi, 2005, pp. 290-293, vol. 61, No. 11 [retrieved: Dec. 16, 2019] URL:https://www.jstage.jst.go.jp/article/fiber/61/11/61_11_P290/_pdf (four (4) pages).
International Search Report (PCT/ISA/210) issued in PCT Application No. PCT/JP2019/045861 dated Dec. 24, 2019 with English translation (five (5) pages).
Japanese-language Written Opinion (PCT/ISA/237) issued in PCT Application No. PCT/JP2019/045861 dated Dec. 24, 2019 (three (3) pages).
Chinese-language Office Action issued in Chinese Application No. 2019800080521.3 dated May 7, 2023 with English translation (13 pages).
Chinese-language Office Action issued in Chinese Application No. 201980080521.3 dated Dec. 1, 2022 with English translation (13 pages).
Japanese-language Office Action issued in Japanese Application No. 2018-228738 dated Dec. 6, 2022 with English translation (seven (7) pages).
Japanese-language Office Action issued in Japanese Application No. 2018-228738 dated Sep. 6, 2022 with English translation (six (6) pages).
Chinese-language Office Action issued in Chinese Application No. 201980080521.3 dated Jun. 13, 2022 with English translation (12 pages).
Japanese-language Office Action issued in Japanese Application No. 2018-228738 dated Aug. 22, 2023 with English translation (13 pages).

* cited by examiner

SPEAKER DIAPHRAGM AND HEADPHONE

CROSS-REFERENCE TO RELATED APPLICATIONS

This application is a continuation application of International Application No. PCT/JP2019/045861, filed on Nov. 22, 2019, which claims priority to Japanese Patent Application No. 2018-228738, filed in Japan on Dec. 6, 2018. The entire disclosures of International Application No. PCT/JP2019/045861 and Japanese Patent Application No. 2018-228738 are hereby incorporated herein by reference.

BACKGROUND

The present disclosure relates to a speaker diaphragm and a headphone.

With regard to audio devices, there are cases in which in order to enable reproduction of sounds over a broad range of frequency bands, from a low frequency to a high frequency, distinct ranges are divided between a plurality of speakers. Examples of such speakers include: a woofer, which reproduces a low-frequency range; a squawker, which reproduces a middle-frequency range; and a tweeter, which reproduces a high-frequency range.

Of these speakers, for example, a diaphragm for a tweeter is required to be light in weight, and to have a high elastic modulus and a high internal loss (tan $\delta$). From such a viewpoint, recently, a speaker diaphragm consisting of a sheet-formed product of cellulose nanofibers has been proposed.

On the other hand, when the speaker diaphragm is formed from the sheet-formed product of the cellulose nanofibers, a reproduction range of frequencies may be narrow, and it may be difficult to reproduce intended sounds. Accordingly, in order to adjust the elastic modulus and the like, a speaker diaphragm consisting of a mixed body of cellulose nanofibers and other fibers has also been.

SUMMARY

The conventional speaker diaphragm is formed by mixing cellulose nanofibers with wood pulp. With regard to this speaker diaphragm, it is considered that by increasing a proportion of the wood pulp, an elastic modulus decreases, whereby an internal loss increases, thus enabling broadening a reproduction range of frequencies by a certain degree.

However, this speaker diaphragm has a disadvantage in that the proportion of the wood pulp being higher results in flexural rigidity decreasing, whereby vibration propagation speed decreases. In the case of a speaker diaphragm obtained by thus mixing cellulose nanofibers, it is considered that there is a tradeoff between the internal loss and the vibration propagation speed.

The present disclosure was made in view of the aforementioned circumstances, and an object of the present disclosure is to provide: a speaker diaphragm with a feature of having a mixed layer containing cellulose nanofibers, wherein the speaker diaphragm enables broadening a reproduction range of frequencies and inhibiting a decrease in the vibration propagation speed; and a headphone.

According to one aspect of the present disclosure made for solving the aforementioned problems, a speaker diaphragm has a mixed layer containing: cellulose nanofibers; and polyparaphenylenebenzobisoxazole fibers. Other objects, advantages and novel features of the present disclosure will become apparent from the following detailed description of one or more preferred embodiments when considered in conjunction with the accompanying drawings, in which:

DETAILED DESCRIPTION

The speaker diaphragm according to one aspect of the present disclosure has a mixed layer containing: cellulose nanofibers; and polyparaphenylenebenzobisoxazole fibers.

An average length of the polyparaphenylenebenzobisoxazole fibers is preferably 0.5 mm or more and 4.0 mm or less.

A content of the polyparaphenylenebenzobisoxazole fibers with respect to 100 parts by mass in terms of a total content of the cellulose nanofibers and the polyparaphenylenebenzobisoxazole fibers is 10 parts by mass or more and 50 parts by mass or less.

A density of the mixed layer is preferably 400 kg/m$^3$ or more and 900 kg/m$^3$ or less.

An average thickness of the mixed layer is preferably 0.02 mm or more and 0.20 mm or less.

The speaker diaphragm preferably consists of a single-layer body of the mixed layer.

Furthermore, a headphone according to another aspect of the present disclosure includes the speaker diaphragm of the one aspect of the present disclosure.

It is to be noted that "cellulose nanofibers" as referred to herein mean cellulose fibers including fine cellulose fibers each having a nanosized fiber diameter. Moreover, the "average length" of fibers means an average value of lengths of 10 arbitrary fibers. The "average thickness of the mixed layer" means an average value of thicknesses at 10 arbitrary points of the mixed layer.

Due to having the mixed layer in which the cellulose fibers and the polyparaphenylenebenzobisoxazole fibers are mixed, the speaker diaphragm enables broadening a reproduction range of frequencies and inhibiting a decrease in vibration propagation speed.

Due to including the speaker diaphragm, the headphone enables broadening the reproduction range of the frequencies and inhibiting the decrease in the vibration propagation speed.

Hereinafter, embodiments of the present disclosure will be explained in detail with reference to the drawings as appropriate.

Speaker Diaphragm

Figure 1:
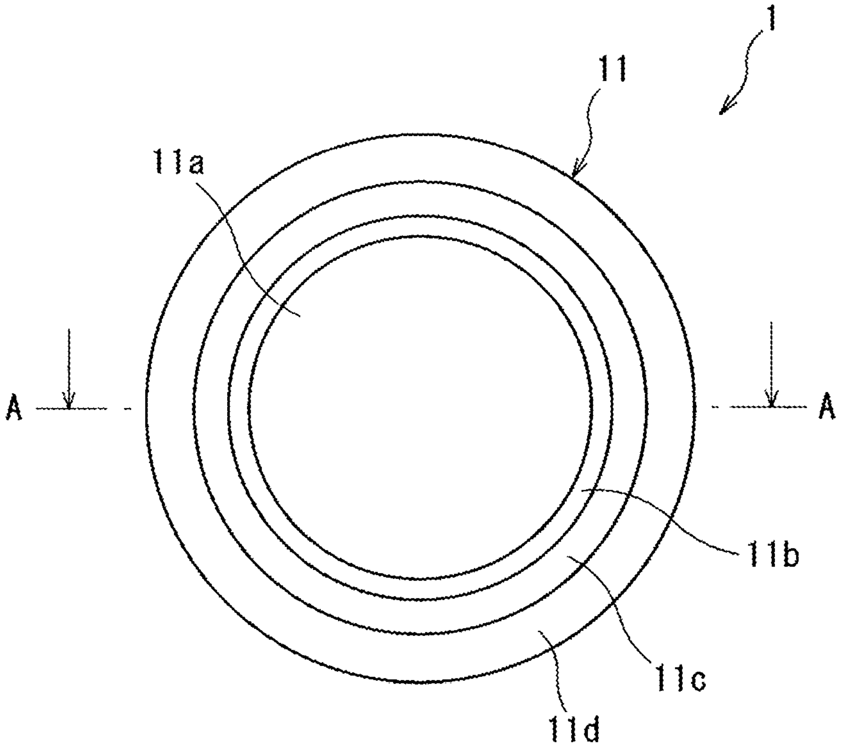
FIG. 1 is a schematic front view of a speaker diaphragm.
Figure 2:
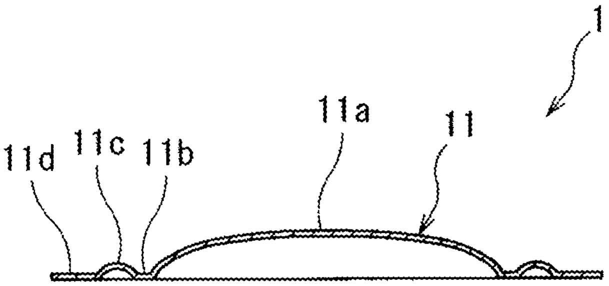
FIG. 2 is a cross-sectional view of the speaker diaphragm in FIG. 1, taken along A-A.

A speaker diaphragm 1 in FIGS. 1 and 2 has a mixed layer 11 containing cellulose nanofibers (CNFs) and polyparaphenylenebenzobisoxazole fibers (PBO fibers). The speaker diaphragm 1 consists of a single-body layer of the mixed layer 11. Since the speaker diaphragm 1 consists of the single-layer body of the mixed layer 11, qualities of the diaphragm as a whole are easily controlled by the mixed layer 11.

The mixed layer 11 is formed by using a sheet-forming mold having a shape corresponding to the speaker diaphragm 1 to mix a slurry in which formation materials for the mixed layer 11 containing the CNFs and the PBO fibers are dispersed in a dispersing medium. The CNFs and the PBO fibers do not have a specific orientation in the mixed layer 11.

The dispersion medium is exemplified by aqueous dispersion mediums such as water, an aqueous solution of methanol, and an aqueous solution of ethanol. A solid content percentage in the slurry can be, for example, 0.1% by mass or more and 10% by mass or less. Furthermore, the sheet-forming mold is acceptable as long as it has a shape corresponding to a desired speaker diaphragm, captures the formation materials for the mixed layer 11, and allows the dispersion medium to permeate. Specific examples of such a sheet-forming mold include a metal mesh, a perforated metal, and the like.

As a result of earnest studies made by the present inventors, it was found that adopting PBO fibers as the fibers to be mixed with the CNFs enables: decreasing an elastic modulus of the mixed layer 11 formed by mixing these fibers, thereby broadening the reproduction range of frequencies; and maintaining flexural rigidity of the mixed layer 11 at a high level, thereby inhibiting the decrease in the vibration propagation speed. A reason for enabling maintaining the flexural rigidity of the mixed layer 11 at the high level can be offered as follows: due to the PBO fibers, which have a comparatively large fiber diameter and comparatively high rigidity, being interposed between the CNFs, spaces between the fibers can be enlarged, decreasing a density of the mixed layer 11, and thickness of the mixed layer 11 can be increased.

The speaker diaphragm 1 can be suitably employed as, for example, a tweeter diaphragm being in a semi-hard dome shape. The speaker diaphragm 1 (i.e., the mixed layer 11) has a dome-shaped main body part 11*a* which vibrates by a driving portion in response to a voice signal inputted from externally, thereby emitting a sound wave. Furthermore, the speaker diaphragm 1 has: a circular inner flat part 11*b* which continues from an outer circumferential edge of the main body part 11*a*; a circular protruding part 11*c* which continues from an outer circumferential edge of the inner flat part 11*b*, and curves convexly toward a front side (a side toward which the main body part 11*a* protrudes); and a circular outer flat part 11*d* which continues from an outer circumferential edge of the protruding part 11*c*. The speaker diaphragm 1 is attached to a housing of the speaker by, for example, joining the inner flat part 11*b*, the protruding part 11*c*, and the outer flat part 11*d* thereto with edge rubber. The speaker diaphragm 1 may, for example, have a substantially uniform thickness, or a thickness of edge parts (the inner flat part 11*b*, the protruding part 11*c*, and the outer flat part 11*d*) may be less than a thickness of the main body part 11*a*. With regard to the speaker diaphragm 1, when the thickness of the edge parts is reduced, a lowest resonance frequency can be reduced, thereby facilitating broadening the reproduction range of the frequency.

The lower limit of an average thickness of the mixed layer 11 (in the case in which the mixed layer 11 has the main body part 11*a* and the edge parts, an average thickness of the main body part 11*a*) is preferably 0.02 mm, more preferably 0.05 mm, and still more preferably 0.12 mm. On the other hand, the upper limit of the average thickness of the mixed layer 11 is preferably 0.20 mm, and more preferably 0.17 mm. When the average thickness is less than the lower limit, it may not be possible to sufficiently increase the flexural rigidity of the speaker diaphragm 1. Conversely, when the average thickness exceeds the upper limit, sufficiently achieving a reduction in weight of the speaker diaphragm 1 may be difficult.

The CNFs can be obtained by, for example, defibrating a plant material (fiber material) by a well-known method.

The lower limit of an average diameter of the CNFs is preferably 0.01 and more preferably 0.1 On the other hand, the upper limit of the average diameter of the CNFs is preferably 5.0 and more preferably 1.0 When the average diameter is less than the lower limit, it may not be easy to form the mixed layer 11. Conversely, when the average diameter exceeds the upper limit, uniform dispersibility of the PBO fibers in the mixed layer 11 may be insufficient. It is to be noted that "diameter" as referred to herein means a diameter in a case in which a cross-section perpendicular to an axial direction is converted into a perfect circle of the same area, and "average diameter" as referred to herein means an average value of diameters of 10 arbitrary fibers.

In the mixed layer 11, the PBO fibers are partially interposed between a plurality of CNF fibers. As a result, the speaker diaphragm 1 enables the vibration propagation speed of the mixed layer 11 to be maintained by inhibiting a decrease in the flexural rigidity, while effectively reducing the density of the mixed layer 11 by enlarging the spaces between the fibers due to the PBO fibers being interposed. The CNFs and the PBO fibers contact each other, but are not joined together.

The lower limit of an average length of the PBO fibers is preferably 0.5 mm, and more preferably 1.0 mm. On the other hand, the upper limit of the average length is preferably 4.0 mm, more preferably 3.5 mm, still more preferably 3.0 mm, and particularly preferably 2.0 mm. When the average length is less than the lower limit, it may be difficult to mix the CNFs with the PBOs. Conversely, when the upper limit exceeds the average length, the PBO fibers may become tangled and clump together, and the dispersibility thereof in the mixed layer 11 may degrade; as a result, it may be difficult to control the qualities of the mixed layer 11.

An average diameter of the PBO fibers is greater than the average diameter of the CNFs. The lower limit of the average diameter of the PBO fibers is preferably 5 and more preferably 10 On the other hand, the upper limit of the average diameter is preferably 100 and more preferably 50 When the average diameter is less than the lower limit, sufficiently enlarging spaces (spaces between the CNFs) in the mixed layer 11 by the PBO fibers may be difficult. Conversely, when the average diameter exceeds the upper limit, a difference between the diameters of the CNFs and the diameters of the PBO fibers may become so great that mixing the CFOs with the PBO fibers may be difficult.

In the speaker diaphragm 1, the elastic modulus and the like resulting from the CNFs are regulated by the PBO fibers. Accordingly, a content of the PBO fibers is preferably less than or equal to a content of the CNFs. The speaker diaphragm 1 enables the uniform dispersibility of the PBO fibers in the mixed layer 11 to be sufficiently increased due to mixing the CNFs, which have a high dispersion amount and a small average diameter, with the PBO fibers, which have a low dispersion amount and a large average diameter.

The lower limit of a content of the PBO fibers with respect to 100 parts by mass in terms of a total content of the CNFs and the PBO fibers is preferably 10 parts by mass, and more preferably 20 parts by mass. On the other hand, the upper limit of the content is preferably 50 parts by mass, and more preferably 30 parts by mass. When the content is less than the lower limit, it may be difficult to sufficiently regulate the elastic modulus and the like of the mixed layer 11 by the PBO fibers. Conversely, when the content exceeds the upper limit, it may be difficult to sufficiently maintain the vibration propagation speed of the mixed layer 11 resulting from the CNFs.

As described above, in the speaker diaphragm 1 (the mixed layer 11), the spaces between the fibers can be enlarged due to mixing the CNFs with the PBO fibers. Accordingly, when compared with a diaphragm consisting of a sheet-formed layer of only the CNFs having a single surface density, the speaker diaphragm 1 enables increasing the thickness while simultaneously attempting to decrease the density. The speaker diaphragm 1 enables: decreasing the elastic modulus and broadening the reproduction range of the frequencies due to reducing the density of the mixed layer 11; and increasing the flexural rigidity and maintaining the vibration propagation speed at the high level due to increasing the thickness of the mixed layer 11. From such a viewpoint, the speaker diaphragm 1 (i.e., the mixed layer 11) preferably does not contain fibers other than the CNFs and the PBO fibers. On the other hand, the speaker diaphragm 1 may contain the fibers other than the CNFs and the PBO fibers within a range not leading to impairment of the effects of the present disclosure, and in this case, the upper limit of a content of the other fibers with respect to 100 parts by mass in terms of the total content of the CNFs and the PBO fibers is preferably 10 parts by mass, and more preferably 5 parts by mass.

Furthermore, as described above, with regard to the speaker diaphragm 1, sizes of the spaces between CNF fibers in the mixed layer 11 are regulated by the PBO fibers. Accordingly, in light of enhancing the function of regulating the spaces by the PBO fibers, it is not necessary that the speaker diaphragm 1 (i.e., the mixed layer 11) contain a binder component. However, the speaker diaphragm 1 may contain a thermoplastic resin as the binder component within a range not leading to impairment of the effects of the present disclosure. The thermoplastic resin is exemplified by polyolefins such as polyethylene and polypropylene.

It is to be noted that the speaker diaphragm 1 may contain other component(s), such as a coloring agent, an ultraviolet ray-absorbing agent, and/or the like, within a range not leading to impairment of the effects of the present disclosure.

The lower limit of the density of the mixed layer 11 is preferably 400 $kg/m^3$, and more preferably 450 $kg/m^3$. On the other hand, the upper limit of the density of the mixed layer 11 is preferably 900 $kg/m^3$, more preferably 800 $kg/m^3$, still more preferably 700 $kg/m^3$, and particularly preferably 650 $kg/m^3$. When the density is less than the lower limit, rigidity of the speaker diaphragm 1 may be insufficient. Conversely, when the density exceeds the upper limit, the elastic modulus of the speaker diaphragm 1 may be too high, and thus the reproduction range of the frequencies may be insufficient.

The lower limit of a storage elastic modulus of the mixed layer 11 is preferably 1.5 GPa, and more preferably 2.0 GPa. On the other hand, the upper limit of the storage elastic modulus of the mixed layer 11 is preferably 6.0 GPa, and more preferably 3.5 GPa. When the storage elastic modulus is less than the lower limit, it may be difficult to apply the speaker diaphragm 1 as a tweeter diaphragm. Conversely, when the storage elastic modulus exceeds the upper limit, the reproduction range of the frequencies may be insufficient.

The lower limit of an internal loss (tan $\delta$) of the mixed layer 11 is preferably 0.02, and more preferably 0.025. When the internal loss (tan $\delta$) of the mixed layer 11 is less than the lower limit, a vibration attenuation rate may be insufficient, and therefore reverberant sound may increase. On the other hand, the upper limit of the internal loss (tan $\delta$) of the mixed layer 11 is not particularly limited, and can be, for example, 0.06.

Advantages

Due to having the mixed layer 11 in which the CNFs are mixed with the PBO fibers, the speaker diaphragm 1 enables broadening the reproduction range of the frequencies, and inhibiting the decrease in the vibration propagation speed.

Headphone

Figure 3:
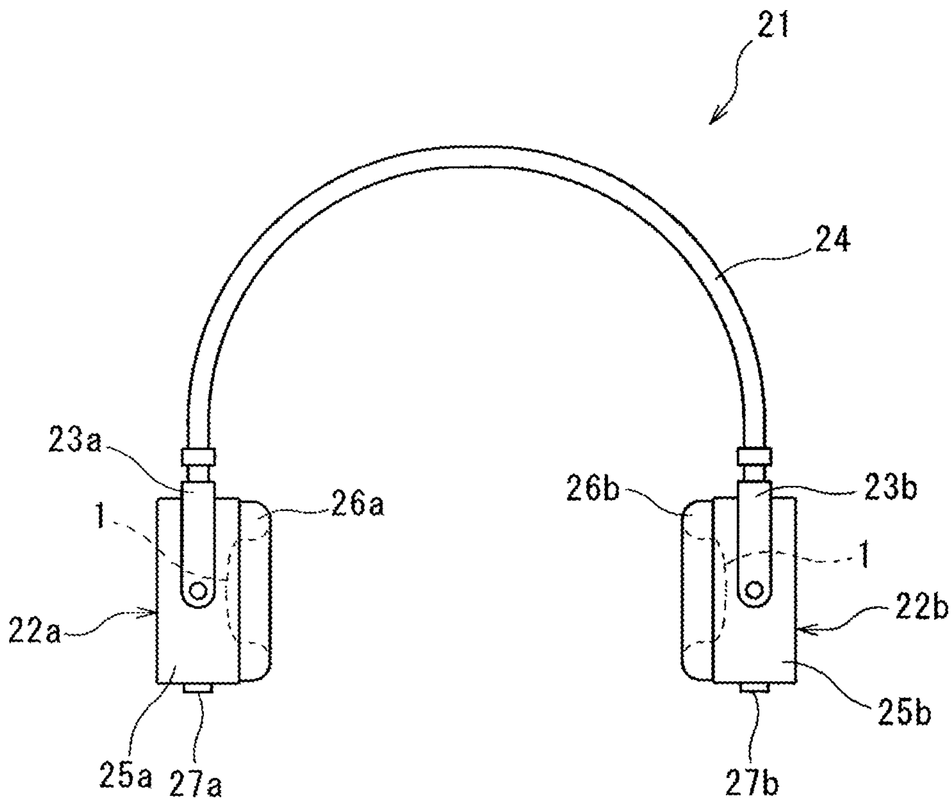
FIG. 3 is a schematic view illustrating a headphone including the speaker diaphragm in FIG. 1.

A headphone 21 in FIG. 3 has: a pair of housings 22*a* and 22*b* which are to be fitted on a user's ears; a pair of arms 23*a* and 23*b* which are connected to the pair of housings 22*a* and 22*b*; and a headband 24 which connects between the pair of housings 22*a* and 22*b* by means of the pair of arms 23*a* and 23*b*. The pair of housings 22*a* and 22*b* have: main bodies 25*a* and 25*b*, each having a bottomed cylindrical shape being flat in an axial direction; ring-shaped cushions 26*a* and 26*b*, being disposed on ends of opening sides of the main bodies 25 and 25*b*, respectively; connectors 27*a* and 27*b*, being disposed on the main bodies 25*a* and 25*b*, respectively, and being connected to audio cables (not shown in the figure) or the like; and a pair of speaker diaphragms 1 illustrated in FIG. 1, being disposed such that the openings of the main bodies 25*a* and 25*b* are closed. The headphone 21 is configured to enable emitting soundwaves by the pair of speaker diaphragms 1 vibrating in response to a sound signal outputted from the audio cables.

Advantages

Due to including the speaker diaphragm 1, the headphone 21 enables broadening the reproduction range of the frequencies and inhibiting the decrease in the vibration propagation speed.

The embodiments described above do not restrict the constituent features of the present disclosure. Therefore, constituent elements of each part of the above-described embodiments may be omitted, replaced, or added based on the description in the present specification and common technical knowledge, and such omission, replacement, and addition should be construed as falling within the scope of the present disclosure.

For example, the speaker diaphragm may have other layer(s) aside from the aforementioned mixed layer. Such layer(s) is/are exemplified by a coating layer having a water proofing function or the like. In other words, the speaker diaphragm may be a multi-layered body including the mixed layer and the other layer(s) such as the coating layer.

The shape of the speaker diaphragm is not limited to the shape of the above-described embodiment of the present disclosure, and the speaker diaphragm may be, for example, in a flat plate shape.

The speaker diaphragm may be for use in a speaker of an audio device for a household, an automobile, an industrial facility, or the like, and may be for use in a small speaker of earphones or another portable electronic device. Furthermore, even in the case in which the speaker diaphragm is to be used in a headphone, a specific configuration of the headphone is not limited to the configuration of the above-described embodiment of the present disclosure.

EXAMPLES

Hereinafter, the present disclosure will be further described in detail by way of Examples, but the present disclosure is not to be restrictedly interpreted based on the following Examples.

Examples

No. 1

A flat plate-shaped sample, consisting of a mixed layer and having a density of 714 kg/$m^3$ and a surface density of 88.5 g/$m^2$, was produced by mixing CNFs and PBO fibers ("Zylon" (registered trademark), manufactured by Toyobo Co., Ltd.), the PBO fibers having an average length of 1 mm and a fiber diameter being larger than that of the CNFs. In No. 1, a content of the PBO fibers with respect to 100 parts by mass in terms of a total content of the CNFs and the PBO fibers was set to 10 parts by mass. In the present example, the density and the surface density were determined based on values of a test piece being 5 mm×40 mm that was cut out from the sample. It is to be noted that considering that a flat surface area of the test piece was small, a thickness of the test piece was determined from an average value of thicknesses at three arbitrary points.

No. 2

A flat plate-shaped sample, consisting of a mixed layer and having a density of 611 kg/$m^3$ and a surface density of 83.1 g/$m^2$, was produced by mixing the same CNFs and PBO fibers as those of No. 1, and setting a content of the PBO fibers, with respect to 100 parts by mass in terms of a total content of the CNFs and the PBO fibers, to 20 parts by mass.

No. 3

A flat plate-shaped sample, consisting of a mixed layer and having a density of 534 kg/$m^3$ and a surface density of 82.2 g/$m^2$, was produced by mixing the same CNFs and PBO fibers as No. 1, and setting a content of the PBO fibers with respect to 100 parts by mass in terms of a total content of the CNFs and the PBO fibers to 30 parts by mass.

No. 4

A flat plate-shaped sample, consisting of a mixed layer and having a density of 513 kg/$m^3$ and a surface density of 85.1 g/$m^2$, was produced by mixing the same CNFs and PBO fibers as No. 1, and setting a content of the PBO fibers with respect to 100 parts by mass in terms of a total content of the CNFs and the PBO fibers to 40 parts by mass.

No. 5

A flat plate-shaped sample, consisting of a mixed layer and having a density of 471 kg/$m^3$ and a surface density of 87.6 g/$m^2$, was produced by mixing the same CNFs and PBO fibers as No. 1, and setting a content of the PBO fibers with respect to 100 parts by mass in terms of a total content of the CNFs and the PBO fibers to 50 parts by mass.

No. 6

A flat plate-shaped sample was produced similarly to No. 1, except that as the PBO fibers, "Zylon," manufactured by Toyobo Co., Ltd. and having an average length of 3 mm and an average diameter being larger than the CNFs, was used. The sample No. 6 had a density of 684 kg/$m^3$, and a surface density of 93.1 g/$m^2$.

No. 7

A flat plate-shaped sample, consisting of a mixed layer and having a density of 628 kg/$m^3$ and a surface density of 94.1 g/$m^2$, was produced by mixing the same CNFs and PBO fibers as those of No. 6, and setting a content of the PBO fibers with respect to 100 parts by mass in terms of a total content of the CNFs and the PBO fibers to 20 parts by mass.

No. 8

A flat plate-shaped sample, consisting of a mixed layer and having a density of 533 kg/$m^3$ and a surface density of 96.0 g/$m^2$, was produced by mixing the same CNFs and PBO fibers as No. 6, and setting a content of the PBO fibers with respect to 100 parts by mass in terms of a total content of the CNFs and the PBO fibers to 30 parts by mass.

No. 9

A flat plate-shaped sample, consisting of a mixed layer and having a density of 471 kg/$m^3$ and a surface density of 82.8 g/$m^2$, was produced by mixing the same CNFs and PBO fibers as No. 6, and setting a content of the PBO fibers with respect to 100 parts by mass in terms of a total content of the CNFs and the PBO fibers to 40 parts by mass.

No. 10

A flat plate-shaped sample, consisting of a mixed layer and having a density of 421 kg/$m^3$ and a surface density of 81.7 g/$m^2$, was produced by mixing the same CNFs and PBO fibers as No. 6, and setting a content of the PBO fibers with respect to 100 parts by mass in terms of a total content of the CNFs and the PBO fibers to 50 parts by mass.

Comparative Example

No. 11

A flat plate-shaped sample, consisting of a mixed layer and having a density of 858 kg/$m^3$ and a surface density of 91.8 g/$m^2$, was produced by subjecting the same CNFs as in No. 1 to sheet-forming.

Storage Elastic Modulus

A storage elastic modulus (GPa) was measured for each of the samples No. 1 to No. 11. A rectangular test piece having a width of 5 mm, a length of 40 mm, and a thickness of 0.5 mm was cut out from each of the samples, and a dynamic viscoelasticity measurement apparatus ("DMA+150") manufactured by Metravib was used to measure the storage elastic modulus at 23±2° C. in a pulling mode. The measurement results are shown in Table 1.

Flexural Rigidity per Unit Width Flexural rigidity (Pa·$m^4$) per unit width was measured for each of the samples No. 1 to No. 11. The flexural rigidity per unit width was determined by multiplying the storage elastic modulus by a moment of inertia area per unit width. Specifically, assuming that the storage elastic modulus was E (Pa), the thickness of the flat plate-shaped sample was h (m), and the width of the flat plate-shaped sample was b (m), the flexural rigidity per unit width was determined by $E \times bh^3/12$ (given that b=1). The measurement results are shown in Table 1.

Internal Loss (tan δ)

The internal loss (tan δ) was measured for each of the samples No. 1 to No. 11. The internal loss (tan δ) was measured using the same dynamic viscoelasticity measurement apparatus as for the storage elastic modulus. The results are shown in Table 1.

TABLE 1

| — | PBO fibers average length (mm) | PBO fibers content (parts by mass) | Average thickness (mm) | Density ($kg/m^3$) | Surface density ($g/m^2$) | Storage elastic modulus (GPa) | Flexural rigidity by unit width ($Pa \cdot m^4$) | Internal loss (tanδ) |
|---|---|---|---|---|---|---|---|---|
| No. 1 | 1 | 10 | 0.12 | 714 | 88.5 | 5.5 | 0.00079 | 0.026 |
| No. 2 | 1 | 20 | 0.14 | 611 | 83.1 | 4.0 | 0.00091 | 0.029 |
| No. 3 | 1 | 30 | 0.15 | 534 | 82.2 | 3.4 | 0.00096 | 0.030 |
| No. 4 | 1 | 40 | 0.17 | 513 | 85.1 | 2.4 | 0.00098 | 0.040 |
| No. 5 | 1 | 50 | 0.19 | 471 | 87.6 | 2.7 | 0.00154 | 0.037 |
| No. 6 | 3 | 10 | 0.14 | 684 | 93.1 | 5.1 | 0.00117 | 0.025 |
| No. 7 | 3 | 20 | 0.15 | 628 | 94.1 | 4.3 | 0.00121 | 0.022 |
| No. 8 | 3 | 30 | 0.18 | 533 | 96.0 | 3.5 | 0.00170 | 0.024 |
| No. 9 | 3 | 40 | 0.18 | 471 | 82.8 | 3.1 | 0.00151 | 0.025 |
| No. 10 | 3 | 50 | 0.19 | 421 | 81.7 | 3.1 | 0.00177 | 0.026 |
| No. 11 | — | — | 0.11 | 858 | 91.8 | 5.6 | 0.00062 | 0.023 |

Evaluation Results

As shown in FIG. 1, the samples No. 1 to No. 10, which have the mixed layer containing the CNFs and the PBO fibers, achieve a reduction in density as compared with the sample No. 11. Accordingly, each of the samples No. 1 to No. 10 has a low storage elastic modulus, thus enabling broadening the reproduction range of the frequencies. In particular, with respect to the speaker diaphragms of No. 1 to No. 10, the reduction in density is promoted in conjunction with an increase in the content of the PBO fibers, thus enabling further broadening the reproduction range of the frequencies.

Moreover, with regard to the samples No. 1 to No. 10, the surface densities fall within a range being 81.7 $g/m^2$ or more and 96.0 $g/m^2$ or less, these surface densities being substantially equivalent to the surface density of the sample No. 11. In other words, due to the decrease in density and an increase in material thickness being promoted in conjunction with the proportion of the PBO fibers increasing, the speaker diaphragms of No. 1 to No. 10 enable: broadening the reproduction range of the frequencies; and maintaining the flexural rigidity per unit width at a level higher than that of No. 11. From these results, it is believed that acoustic velocities of each of the samples No. 1 to No. 10 is equal to or higher than an acoustic velocity of the sample No. 11, thus enabling the vibration propagation speed to be maintained at a high level.

Furthermore, each of the samples No. 1 to No. 10 enables maintaining the internal loss (tan δ) at a level substantially equal or higher when compared with the sample No. 11.

Based on the above, also with regard to speaker diaphragms in which the shapes of No. 1 to No. 10 have been changed from the flat plate shape to a desired shape, increasing the proportion of the PBO fibers enables: broadening the reproduction range of the frequencies; increasing the internal loss; and maintaining the vibration propagation speed at a high level.

INDUSTRIAL APPLICABILITY

As described above, the speaker diaphragm according to the one embodiment of the present disclosure enables broadening the reproduction range of the frequencies and inhibiting the decrease in the vibration propagation speed, and can therefore be suitably used as a tweeter diaphragm.

What is claimed is:

1. A speaker diaphragm comprising:

a mixed layer, wherein the mixed layer includes cellulose nanofibers, and polyparaphenylenebenzobisoxazole fibers, wherein an average diameter of the cellulose nanofibers is 5.0 μm or less, and an average diameter of the polyparaphenylenebenzobisoxazole fibers is 5 μm or greater and is greater than the average diameter of the cellulose nanofibers.

2. The speaker diaphragm according to claim 1, wherein an average length of the polyparaphenylenebenzobisoxazole fibers is between 0.5 mm and 4.0 mm.

3. The speaker diaphragm according to claim 2, wherein a content of the polyparaphenylenebenzobisoxazole fibers with respect to 100 parts by mass in terms of a total content of the cellulose nanofibers and the polyparaphenylenebenzobisoxazole fibers is between 10 parts by mass and 50 parts by mass.

4. The speaker diaphragm according to claim 3, wherein a density of the mixed layer is between 400 $kg/m^3$ and 900 $kg/m^3$.

5. The speaker diaphragm according to claim 4, wherein an average thickness of the mixed layer is between 0.02 mm and 0.20 mm.

6. The speaker diaphragm according to claim 5, consisting of a single-layer body of the mixed layer.

7. A headphone comprising the speaker diaphragm according to claim 6.

* * * * *